US011052568B2

(12) United States Patent
Rademakers et al.

(10) Patent No.: US 11,052,568 B2
(45) Date of Patent: Jul. 6, 2021

(54) REACTOR SYSTEM AND PROCESS FOR WOOD MODIFICATION

(71) Applicant: Titan Wood Limited, Windsor (GB)

(72) Inventors: Karlijn Rademakers, Velp (NL); Bernardus Jozef Maria Pol, Arnhem (NL); Paul Bussemaker, Zevenaar (NL); Theodorus Gerardus Marinus Maria Kappen, Rosmalen (NL)

(73) Assignee: TITAN WOOD LIMITED, Windsor (GB)

( * ) Notice: Subject to any disclaimer, the term of this patent is extended or adjusted under 35 U.S.C. 154(b) by 561 days.

(21) Appl. No.: 14/403,138

(22) PCT Filed: May 22, 2013

(86) PCT No.: PCT/IB2013/054244
§ 371 (c)(1),
(2) Date: Nov. 21, 2014

(87) PCT Pub. No.: WO2013/175420
PCT Pub. Date: Nov. 28, 2013

(65) Prior Publication Data
US 2015/0165642 A1 Jun. 18, 2015

(30) Foreign Application Priority Data
May 22, 2012 (EP) .................... 12168973

(51) Int. Cl.
B27K 3/10 (2006.01)
C08H 8/00 (2010.01)
(Continued)

(52) U.S. Cl.
CPC .............. B27K 3/10 (2013.01); B27K 3/08 (2013.01); B27K 3/34 (2013.01); C08H 8/00 (2013.01)

(58) Field of Classification Search
CPC ... B27K 3/08; B27K 3/10; B27K 5/00; B27K 3/34; B05D 1/18; B01J 19/18
(Continued)

(56) References Cited

U.S. PATENT DOCUMENTS 2,273,039 A * 2/1942 Hudson ................ B27K 3/0214
34/416
2,417,995 A * 3/1947 Stamm ................ B27K 3/0271
427/254
(Continued)

FOREIGN PATENT DOCUMENTS

JP S58155906 A 9/1983
JP S6140104 A 2/1986
(Continued)

OTHER PUBLICATIONS

International Search Report (dated Nov. 28, 2013) for PCT/IB2013/054244.

Primary Examiner — Dah-Wei D. Yuan
Assistant Examiner — Andrew J Bowman
(74) Attorney, Agent, or Firm — Innovation Capital Law Group, LLP; Vic Lin

(57) ABSTRACT

Disclosed is a reactor system for the modification of lignocellulosic materials. According to the invention, the system comprises a reaction vessel, a vacuum connection and an inlet and/or outlet connected to a gas flow loop connected to a heat exchanger and at least one fluid circulation device. Particularly, gas flow loop is arranged so as to allow gas circulation over the diameter of the reaction vessel. The gas flow loop preferably includes a gas distribution device, such as a distribution plate.

7 Claims, 7 Drawing Sheets

(51) Int. Cl.
*B27K 3/08* (2006.01)
*B27K 3/34* (2006.01)

(58) Field of Classification Search
USPC .......................................................... 427/440
See application file for complete search history.

(56) References Cited

U.S. PATENT DOCUMENTS

| | | | |
|---|---|---|---|
| 3,403,145 A * | 9/1968 | Edge, Jr. | .................. C08B 3/06 |
| | | | 536/71 |
| 4,640,963 A | 2/1987 | Kreider et al. | |
| 5,525,721 A | 6/1996 | Ohshima et al. | |
| 8,512,815 B2 * | 8/2013 | Girotra | .................. B27K 3/346 |
| | | | 427/238 |
| 2010/0331531 A1 | 12/2010 | Mykytka | |
| 2011/0045268 A1 | 2/2011 | Girotra | |

FOREIGN PATENT DOCUMENTS

| | | |
|---|---|---|
| JP | H0584709 A | 4/1993 |
| JP | 2005225103 A | 8/2005 |
| JP | 2006334823 A | 12/2006 |
| WO | 2009095687 A1 | 8/2009 |
| WO | 2011095824 A1 | 8/2011 |

\* cited by examiner

REACTOR SYSTEM AND PROCESS FOR WOOD MODIFICATION

FIELD OF THE INVENTION

The invention is in the field of acetylation of lignocellulosic materials, particularly of solid wood. The invention pertains to a reactor system for the acetylation of lignocellulosic materials, and to a process for the acetylation of lignocellulosic material.

BACKGROUND OF THE INVENTION

In order to produce wood-based materials with a long service life, it has been known to chemically modify the wood and in particular to acetylate the wood. Thereby materials with improved material properties, e.g. dimensional stability, hardness, durability, etc., are obtained.

A reference in this respect is WO 2009/095687. Herein a process is described for the acetylation of wood, comprising the steps of submerging wood into an acetylation liquid in a reaction pressure vessel, conducting an impregnation procedure, removing excess acetylation fluid, introducing an inert fluid (typically nitrogen gas, the inert fluid possibly comprising non-inert acetic anhydride and/or acetic acid) into the vessel, circulating and heating the inert fluid following a heating regime so as to bring about suitable acetylation of the wood, and removing the circulating fluid and allowing the acetylated wood to cool. Whilst the process is highly suitable for achieving effective wood acetylation, the use of standard equipment to carry it out, brings about several drawbacks.

Thus, inter alia, the conditions within the reaction vessel are such that in some phases of the whole procedure it is filled with a corrosive acetylation liquid, generally under conditions of elevated temperature and pressure, This imposes limits on the use of equipment, such as fans, to effectively circulate fluids, such as a fluid that contains acetic acid and/or anhydride as described in WO 2009/095687. These have a relatively short service life, which results in a costly operation.

Further, it is desired to effectively remove acetylation medium from the wood. The general method to accomplish this is by stripping the reactor with a stripping gas, which is allowed to condensate, as a result of which liquid chemicals can be retrieved. An issue with this removal (chemical recovery) is the high energy input required.

A background reference is U.S. Pat. No. 5,525,721. Herein wood is acetylated by applying acetylation fluid exclusively in a vapour phase. The method is applicable for wood fibers and wood strips having a relatively large surface area to volume ratio. The method, and apparatus described, does not lend itself to acetylating solid wood, particularly not of solid wood in the form of e.g. beams or planks having relatively large dimensions. The reference does not address chemical recovery.

SUMMARY OF THE INVENTION

In order to better address one or more of the foregoing desires, the invention presents, in one aspect, the use of a reactor system for the acetylation of lignocellulosic materials, the system comprising a reaction vessel having a closable aperture suitable for the introduction of lignocellulosic material, a liquid-inlet and/or liquid-outlet for acetylation fluid, and a gas-inlet and gas-outlet connected to a first gas flow loop, said first gas flow loop comprising a gas flow line connecting the gas-inlet and the gas-outlet, said gas flow line connected to a heat exchanger and at least one fan, the use being for an acetylation process wherein solid wood is submerged into a liquid acetylation medium.

In another aspect, the invention provides a reactor system for the acetylation of lignocellulosic materials, the system comprising a reaction vessel having a closable aperture suitable for the introduction of lignocellulosic material, a vacuum connection suitable for creating vacuum in the reaction vessel, a liquid-inlet and/or liquid-outlet for acetylation fluid, and a gas-inlet and gas-outlet connected to a first gas flow loop, said first gas flow loop comprising a gas flow line connecting the gas-inlet and the gas-outlet, said gas flow line connected to a heat exchanger and at least one fan, wherein the inlet and the outlet of the first gas flow loop are positioned such as to allow gas circulation over the diameter of the reaction vessel.

In a further aspect, the invention provides a process for the acetylation of lignocellulosic material, comprising introducing the lignocellulosic material into a reaction vessel as defined above, filling the reaction vessel with acetylation fluid so as to submerge the lignocellulosic material; allowing the lignocellulosic material to become impregnated with acetylation fluid; removing excess acetylation liquid, applying heat to the impregnated lignocellulosic material by circulating heated gas through the reactor via said first gas flow loop and, where applicable, via said further gas flow loops, so as to allow acetylation of the lignocellulosic material to occur.

In yet another aspect, the invention relates to a process for the acetylation of lignocellulosic material, comprising the steps of (a) impregnating the lignocellulosic material with an acetylation fluid and removing the excess acetylation liquid; (b) heating the impregnated lignocellulosic material by means of a flow of heated gas so as to allow acetylation of the lignocellulosic material to occur; (c) lowering the pressure to which the lignocellulosic material is subjected so as to allow residual acetylation fluid to migrate out of the lignocellulosic material; (d) allowing gas to act as a stripping gas for the migrated residual acetylation fluid by subjecting such gas to condensation; wherein the gas subjected to condensation is a portion of the circulating heated gas flow.

DETAILED DESCRIPTION OF THE INVENTION

Figure 1:
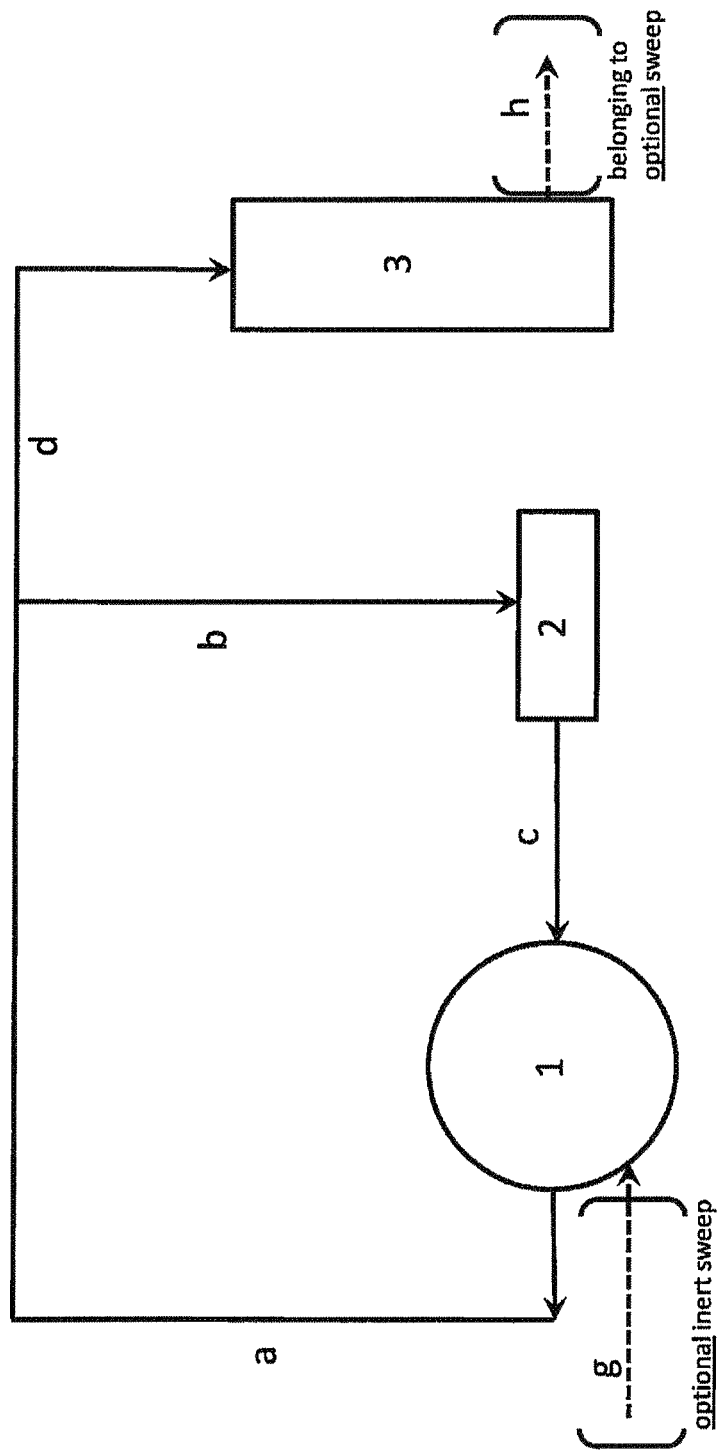
FIG. 1 presents a flow scheme for a process according to the invention.

The acetylation of wood, particularly of solid wood, by means of a liquid acetylation medium in which the wood is submerged, is a process different from chemical reactions in general. This is particularly caused by the nature of the substrate, viz. the wood. It will be understood that wood, certainly when provided as solid wood (which generally comes as long pieces such as planks or beams) itself cannot be processed so as to contribute to an optimal contact with the acetylation fluid and the process conditions triggering reaction. The former requires an optimal impregnation. This is not part of the invention, and can be conducted in manners known in the art, but the preferred total submersion of the wood in acetylation fluid presents potentially hazardous conditions, as a result of a relatively aggressive chemical liquid being under pressure within the reaction vessel. The process conditions, particularly the distribution of the heat that will result in triggering and/or controlling the reaction with water and the actual acetylation reaction within the wood, as well as the energy consumption associated therewith, as well as the uniformity of heat and mass transfer, are positively affected by the present invention.

The reactor system used in the invention will generally comprise a reaction vessel of a type similar to those used for impregnation of wood, while allowing for temperature and pressure conditions suitable for the reaction herein described. Such a vessel will have a closable aperture suitable for the introduction of lignocellulosic material, for example of solid wood. Particularly in the event of solid wood, and more particularly in relative large pieces such as planks or beams, such an aperture will typically be a hatch or a door.

In a broad sense, the invention is based on the judicious insight to circulate the heated gas within a reaction vessel for the acetylation of wood, in such a way as to avoid contact of fans with liquid acetylation medium, and to avoid impregnation pressures on the fans. To this end, a reactor system is used with a gas flow loop comprising a gas flow line connected to a heat exchanger and at least one fan, which is placed outside of the reactor. The latter, whilst being unusual in chemical reactors, is an elegant solution to avoid the action of pressurized acetylation liquid on the blades and/or motors of the fan. The heat exchanger is preferably suitable for heating the gas in the gas flow loop.

It will be understood that, whilst the gas will be heated so as to conduct the acetylation reaction of wood impregnated with acetylation fluid, the same gas flow loop, with heat exchanger, can also be used to provide a cooling gas, when needed as well as the medium and heat for the chemical recovery steps.

The inlet and the outlet of the gas flow loop are preferably positioned such as to allow gas circulation over the diameter of the reaction vessel. Thus, in one embodiment, the invention provides a reactor system as identified above, comprising a plurality of gas flow loops connecting further inlets and outlets of the reaction vessel, said further inlets and outlets positioned such as to allow gas circulation over the diameter of the reaction vessel, said first and further inlets and outlets being divided over the length of the reaction vessel. This presents a technical solution to avoid undue loss of heat, by shortening the path of the gas flowing through the reactor (i.e. transversal to the length of the reactor, rather than longitudinal) and to create a uniform gas flow through the wood stacks. Also the difference in composition of the gas flow will be minimal when conducting it over the diameter of the reactor, as compared to over the length of the reactor. Further, the pressure drop upon gas flow over the diameter of the reactor will be less than upon gas flow over the length of the reactor.

It will be understood that these advantages particularly hold in the event of a reactor that is suitable for the acetylation of relatively large pieces of solid wood, such as beams or planks. Typically, these reactors are impregnation vessels having a ratio of length over diameter (L/D) of 2-20, preferably 3-10. Such impregnation vessels typically have a length of which is generally much larger than the diameter (e.g. a length of 6 m to 36 m, with a diameter of, e.g., 1 m to 6 m).

Particularly when provided in the aforementioned transversal configuration, it is preferred to provide a plurality of such gas flow loops. Preferably, these gas flow loops (e.g. 2 to 12, preferably 3-8 of such loops) are divided over the length of the reaction vessel. More preferably, the gas flow loop is arranged in communication with a gas distribution device, such as a distribution plate, positioned between the inlet and the inside of the reaction vessel. Gas distribution devices are known to the skilled person. A preferred device is a plate provided with holes. Other examples include lamellae, wigs, shaped wall design, constraints, baffles.

Figure 4:
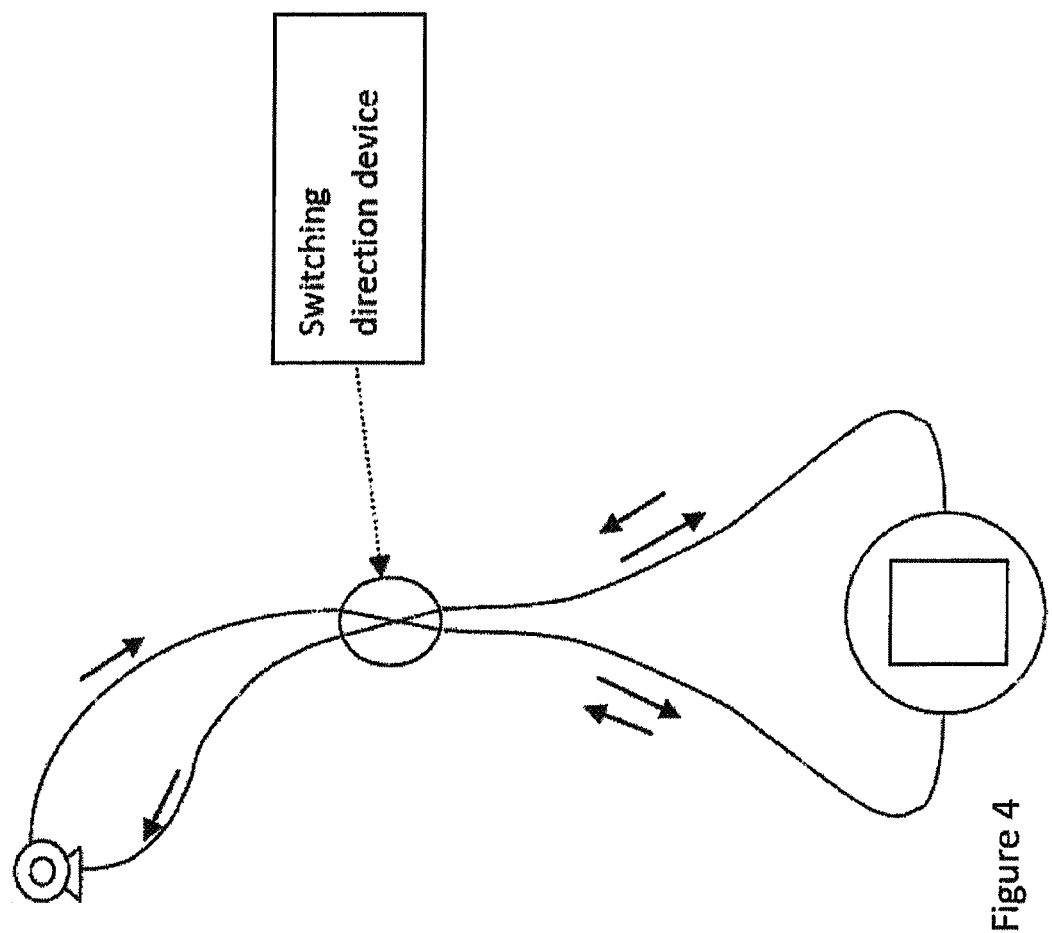
FIGS. 4, 5, 6, and 7 show schematically different possibilities for directing gas flow and/or possibilities for full or partial heat exchange for the gas loop. These figures are further discussed hereinafter.

It is preferred to also include a gas distribution device between the inside of the reactor and the outlet to the first gas flow loop or loops. This serves, particularly in the event that the gas is let in via a distribution device, to optimize the circulation of gas through the substrate to be acetylated. This is of particular benefit in the event that the substrate comprises a stack of solid wood, in large pieces such as beams or planks. Further, in a preferred embodiment, the reactor system of the invention is designed in such a way as to allow a reversal of the direction of the gas flow. FIG. 4 shows a possibility of reversing the direction of the gas flow by means of a switcher S. This way, the homogeneity of the heat and mass transfer can be optimized. In this embodiment, the inlet and outlet to the first gas flow loop or loops will in effect have a reverse meaning upon reversal of the flow (the outlet becoming an inlet, and the inlet becoming an outlet). If in this embodiment it is desired to benefit from the presence of a gas distribution device, such a device will be present on both of the inlet (respectively: outlet) sides of the reaction vessel.

In accordance with the above, the reactor system of the invention is provided with a gas loop system comprising piping that connects a reaction vessel with a heat exchanger and a fan, in random order, back to the reactor. By valves this gas loop can be separated from the reaction vessel to be able to keep high pressure liquid out of the gas loop system and the fan. If no separation between the liquid and the gas system is realized, this would lead to undesired filling of the gas loops with liquid during the impregnation. Another way of avoiding high pressure liquid in the fans is putting the fans at a sufficient height above the reactor.

Figure 5:
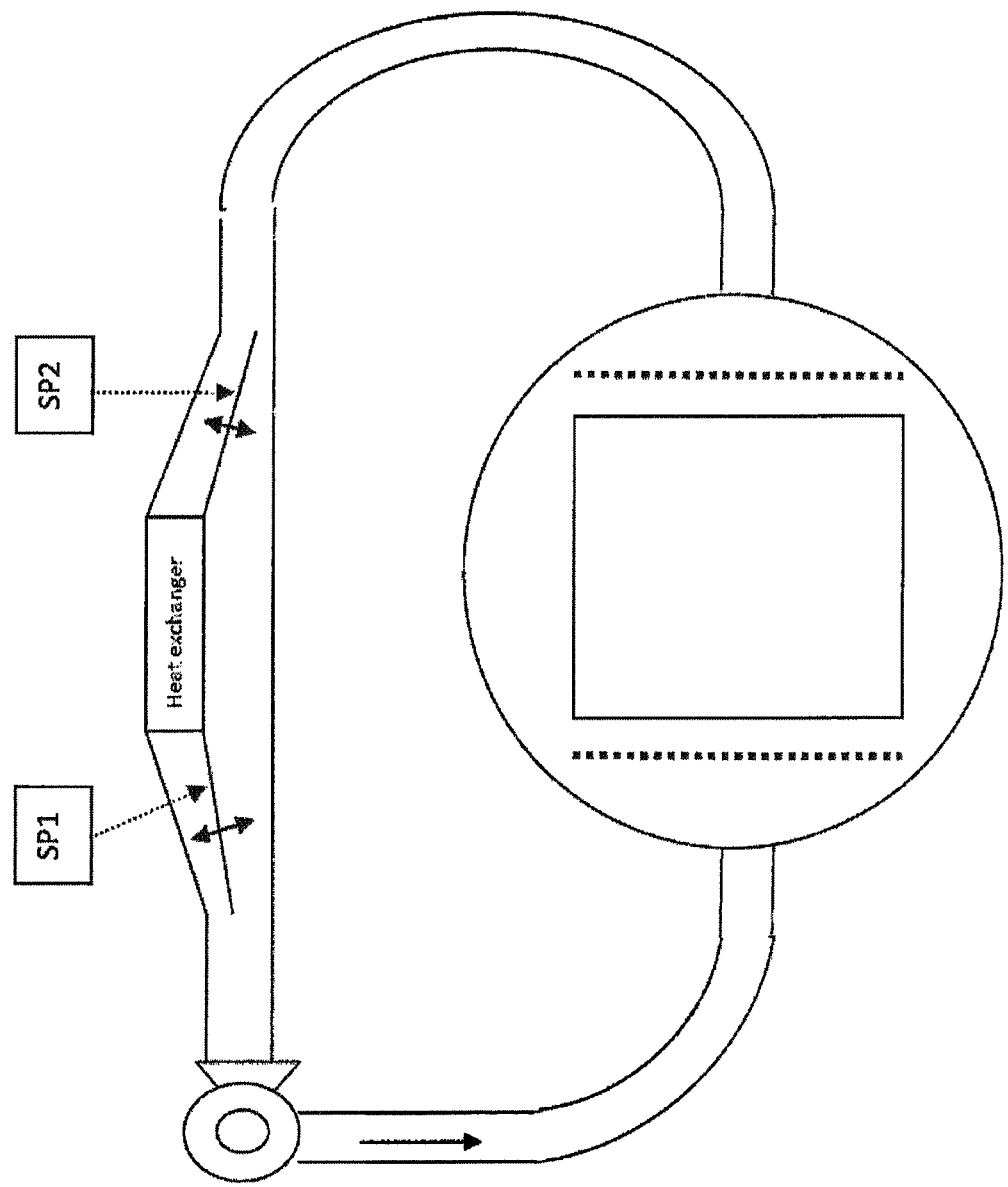
Figure 6:
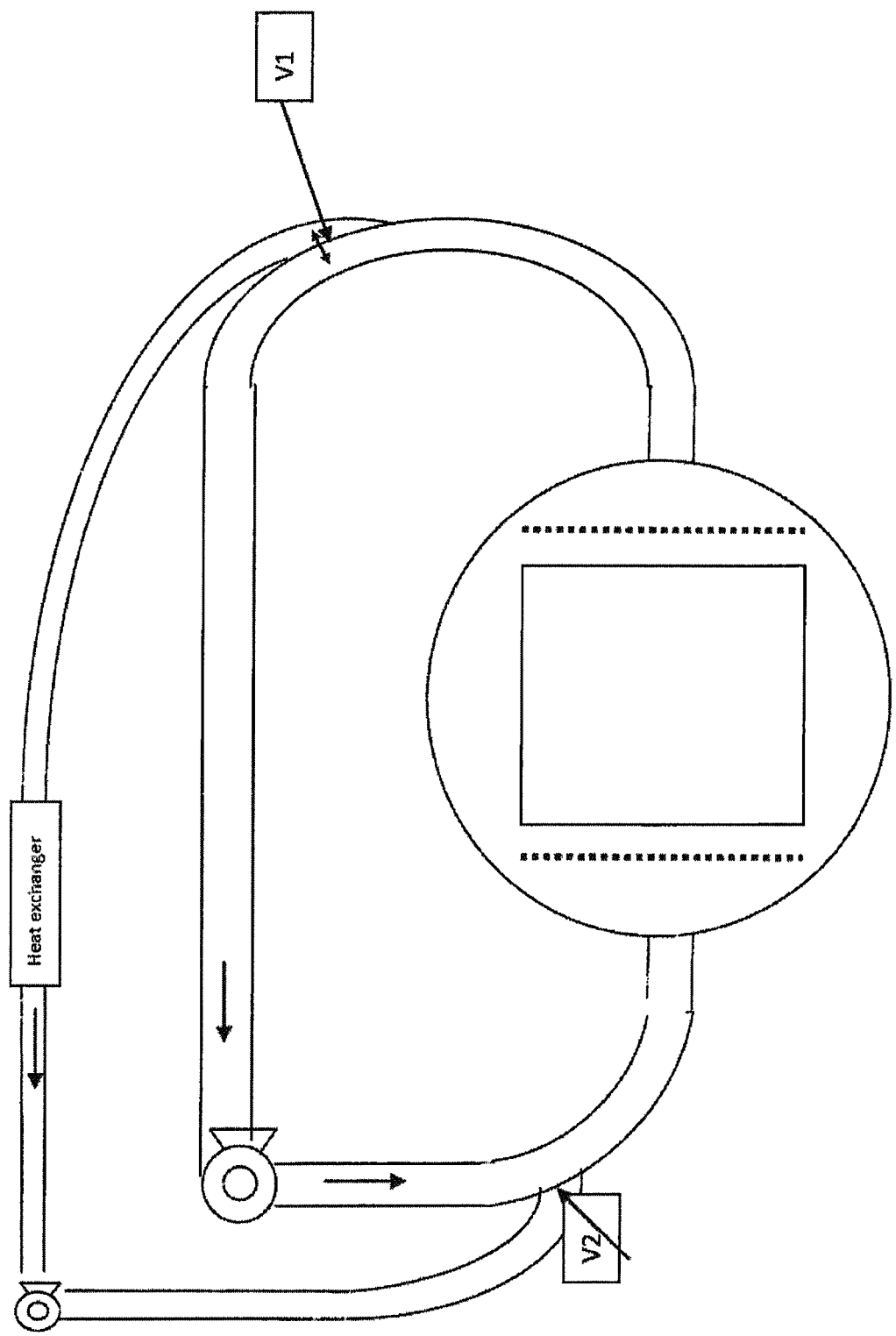

In yet another embodiment, when the heat exchanger is located outside the reactor, it is preferred to be able to lead only a portion of the circulation gas through the heat exchanger to minimize the resistance of the gas flow. This is of particular interest in phases of the whole procedure when the required heat exchange is only part of the maximum of the total heat exchanging capacity. This improves energy efficiency and/or maximizes gas velocities. FIG. 5 shows a possibility to switch the gas flow into a portion going through the heat exchanger and a portion not going through the heat exchanger. This is controlled by the Valves SP1 and SP2. FIG. 6 shows another possibility to switch the gas flow into a portion going through the heat exchanger and a portion not going through the heat exchanger. This is controlled by the Valves V1 and V2.

In another embodiment of this invention, the heat exchanger can be located inside the reactor, and may even have a dual function as a gas distribution device as well. When inside the reactor, it is preferred to have heat exchangers on both the inlet and the outlet side of the reactor.

This option of having the heat exchanger inside the reactor holds for any other embodiment wherever an external heat exchanger is mentioned.

Figure 7:
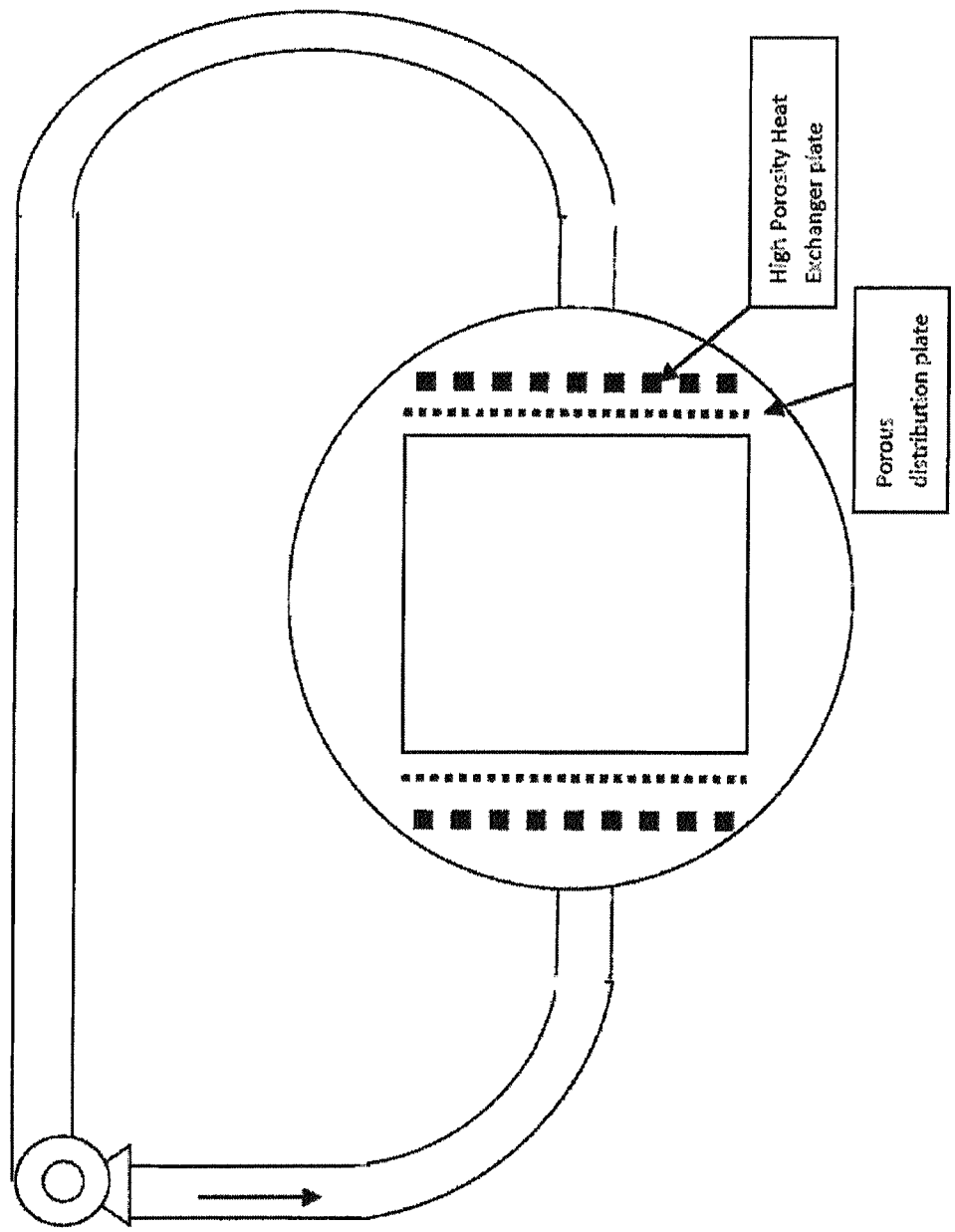

FIG. 7 shows a scheme for a configuration having a heat exchanger inside the reactor on both sides of the wood stack. The heat exchanger and the distribution plate can also be combined into only one plate.

In an interesting embodiment, the reactor system of the invention is set up such that the reactor system, including both the reaction vessel and the circulation gas loop, comprises an outlet connected to an additional gas flow line, said additional gas flow line connected to a condenser system. In this embodiment, the condenser system can be connected, downstream, to an inlet of the reaction vessel for non-condensed gases/vapours, or to an outlet for the process stream from the condenser, e.g. to a scrubber.

In an interesting embodiment, the reactor system further comprises an inlet and an outlet for the introduction of additional gas, typically for an inert gas that serves as a "sweep gas" aiding in the recovery of non-reacted acetylation fluid and reaction products. The inlet and outlet for this additional gas can be provided as an integral part of the above-described circulation system (i.e. a feed of the gas is introduced via the same gas flow line that is connected to at least one fan). In another embodiment, the inlet and outlet for the additional gas are provided separately on the reactor. The additional, inert gas typically is nitrogen.

It should be noted that the aforementioned inert gas, which in the acetylation process is employed in order to add pressure and heat to the reaction vessel, can also be used (when controlling the reaction) for cooling purposes. The design according to the invention, which involves a heat exchanger in the gas loop, preferably outside of the reactor, makes this well possible.

The invention also relates to a process for the acetylation of lignocellulosic material, comprising introducing the lignocellulosic material into a reaction vessel as defined above, in any embodiment, filling the reaction vessel with acetylation fluid so as to submerge the lignocellulosic material; allowing the lignocellulosic material to become impregnated with acetylation fluid; removing the excess acetylation fluid, applying heat to the impregnated lignocellulosic material by circulating heated gas through the reactor via said first gas flow loop and, where applicable, via said further gas flow loops, so as to allow acetylation of the lignocellulosic material to occur. Control of the temperature during acetylation is between 60 and 200° C., more preferably between 80 and 160° C.

During acetylation, the impregnated lignocellulosic material will preferably be kept under pressure, generally between 0 and 6 barg, and preferably between 0.5 and 4 barg.

It is further desired to add a chemical recovery process step, so as to recover unreacted acetylation fluid from the lignocellulosic material and recover the acid products resulting from the reaction with the water in the wood and with the wood itself. This is preferably done by means of a stripping gas. This stripping gas is preferably heated. The stripping gas (which may also be superheated acetic acid and/or acetic anhydride) preferably originates from the same gas loop (inert gas, such as nitrogen, that becomes saturated with acetic acid and/or acetic anhydride during the process), i.e. the "circulating gas" that circulates through the reaction vessel during acetylation. In a preferred embodiment, the process of the invention, after acetylation of the lignocellulosic material, further comprises lowering the pressure to which the lignocellulosic material is subjected so as to allow residual acetylation fluid to migrate out of the lignocellulosic material. The initial phase of this process of recovery of acetylation fluid is based on expansion due to evaporation, as a result of lowering of pressure and heating, wherein the gas also serves to provide heat for affecting evaporation. Further onwards, the gas is believed to act as a stripping gas for the migrated residual acetylation fluid. The gas used in this recovery process is subjected to condensation; and according to this aspect of the invention, the gas subjected to condensation is a portion of the above-mentioned circulating gas.

By splitting off to condensation only a portion of the (heated) gas flow circulating in the reaction vessel, a considerable energy advantage is obtained. The portion is less than 50% by volume for the whole drying process. Typically, the volume split off for condensation will be decreased during the chemical recovery process. E.g., ultimately, the ratio of the split-off flow to the main flow of circulating gas can be as low as 1:30. On average, the ratio will be 1:2 to 1:8, preferably 1:4 to 1:6.

The acetylation process of the invention can be applied to any lignocellulosic material. The term lignocellulosic material generally refers to any material containing cellulose and lignin (and optionally other materials such as hemicelluloses). Typically, this refers to, e.g., wood, bark, kenaf, hemp, sisal, jute, crop straws, nutshells, coconut husks, grass and grain husks and stalks, corn stover, bagasse, conifer and hardwood barks, corn cobs, other crop residuals and any combination thereof.

Preferably, the lignocellulosic material is wood. Wood may be selected from any species of hardwood or softwood. In some embodiments the wood is a softwood. In some embodiments the wood is selected from pine, fir and spruce. In some embodiments the wood is a hardwood. In some embodiments, the wood is selected from red oak, red maple, German beech, and Pacific albus, poplar, oak, maple, alder and beech. In some embodiments, the wood is a pine species. In some embodiments, the pine species is radiata pine, Scots pine, or Southern Yellow Pine.

The lignocellulosic material may be in any form. Examples include shredded material (e.g. shredded wood), fiberized material (e.g. fiberized wood), wood flour, chips, particles, excelsior, flakes, strands, wood particles and materials such as trees, tree trunks or limbs, debarked tree trunks or limbs, boards, veneers, planks, squared timber, beams or profiles, and other cut lumber of any dimension. The present invention (reactor system and process) is preferably applied to solid wood. Solid wood generally refers to relatively large pieces of wood, such as planks or beams. Generally, solid wood has a length of at least ten centimeters, and preferably at least one meter, in at least one dimension. Preferred dimensions are a length of 0.5 to 6 m, a thickness of 5 to 200 mm, preferably 10 to 100 mm, and a width of 30 to 500 mm, preferably 50 to 250 mm.

Prior to the introduction into the reaction vessel, the moisture content of the lignocellulosic material is preferably reduced. The moisture content before acetylation is preferably 0.5 to 20%, more preferably 1-10%, and most preferably 2-5%.

The impregnation with acetylation fluid is preferably conducted by first putting the reaction vessel, when filled with the wood or other lignocellulosic material, under vacuum and then introducing the acetylation fluid (acetic acid and/or acetic anhydride) while maintaining vacuum, preferably so as to completely submerge all the wood or other lignocellulosic material. To this end, the reaction system also comprises a vacuum connection, e.g. a vacuum pump, suitable for creating vacuum in the reaction vessel. The vacuum connection can be located on the reaction vessel, on the gas loop or on both. The vacuum connection may be connected with a condenser, gas liquid separator and then a vacuum pump. In the condenser, vapours are condensed. In the gas/liquid separator the condensed liquid is separated from the inert. The vacuum pump provides the low pressure in the reactor and hereby improves the drying speed. Any suitable vacuum pump can be used.

The pressure is increased by means of the inert gas (typically nitrogen or carbon dioxide) or by a pressure pump. As also described in WO 2009/095687, the skilled person will understand that this will become partially or totally saturated with vapors of acetylation fluid. Impregnation by a pressure pump supplies the required additional acetylation fluid and pressure to the reaction vessel, however avoids large volumes of high pressure inert partially or totally saturated with vapors of acetylation fluid.

After the impregnation procedure the excess acetylation liquid is removed from the reactor and the volume replaced by a suitable fluid having a specific density enabling the transport of heat from or to the lignocellulosic material, such as partially saturated nitrogen.

As described above, the gas flow through the reactor will be used to add heat, so as to further promote the acetylation reaction in the lignocellulosic material. Typical temperatures for the heated gas range from 60° C. to 200° C., preferably of from 70° C. to 180° C., and most preferably the temperature of the circulating gas is in a range of 80° C. to 160° C. Pressures typically range from 0 to 6 barg, preferably from 0.5 to 4 barg. Reaction times typically range between 30 and 800 min, preferably between 100 and 500 min, and more preferably between 150 and 350 min.

FIG. 1 presents a flow scheme for a process according to the invention. Herein the system elements shown (schematically, in cross-section) are a reactor (1), a heater (2), and a condenser (3). A gas flow (a) from the reactor (1) is split into a gas flow (b)—that is directed to the heater (2) from which a gas flow (c) is transported back to the reactor (1)—and a gas flow (d) which is fed to the condenser (3). Optional sweep gas flows are shown as flows (g) and (h).

Figure 2:
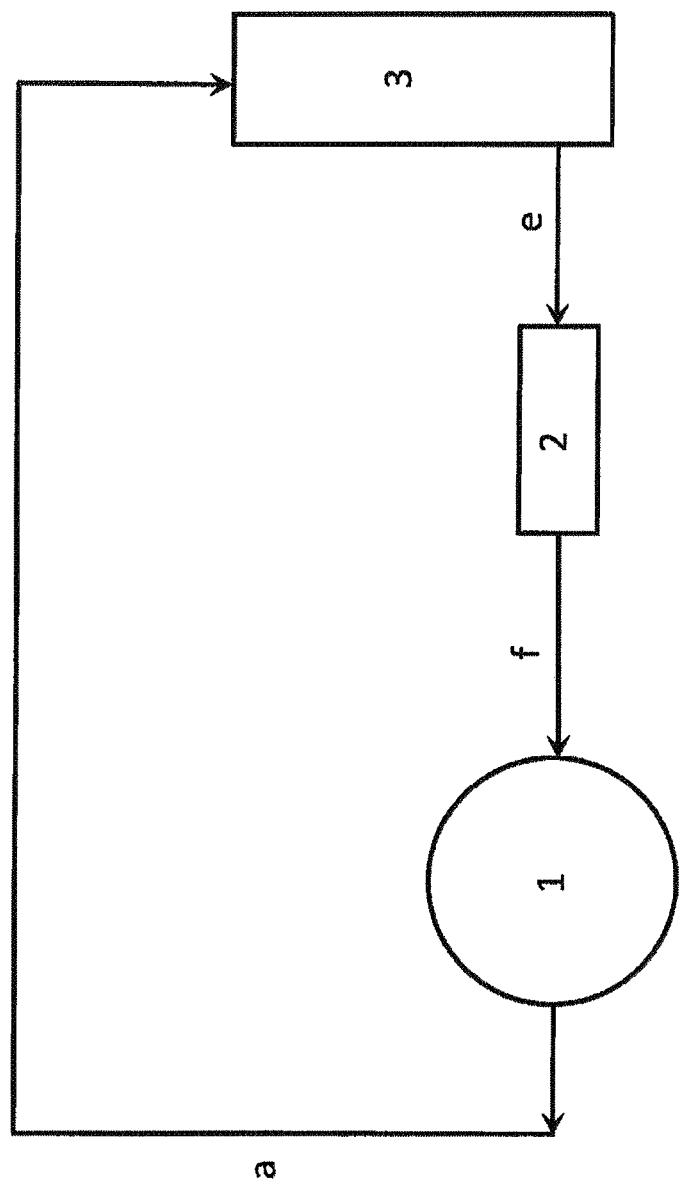
FIG. 2 presents a flow scheme for an alternative process according to the invention.

FIG. 2 presents a flow scheme for an alternative process. Therein the system elements are as shown in FIG. 1. The gas flows are a flow (a) from the reactor (1) to the condenser (3), a flow (e) from the condenser (3) to the heater (2), and a flow (f) from the heater (2) back to the reactor (1).

Figure 3:
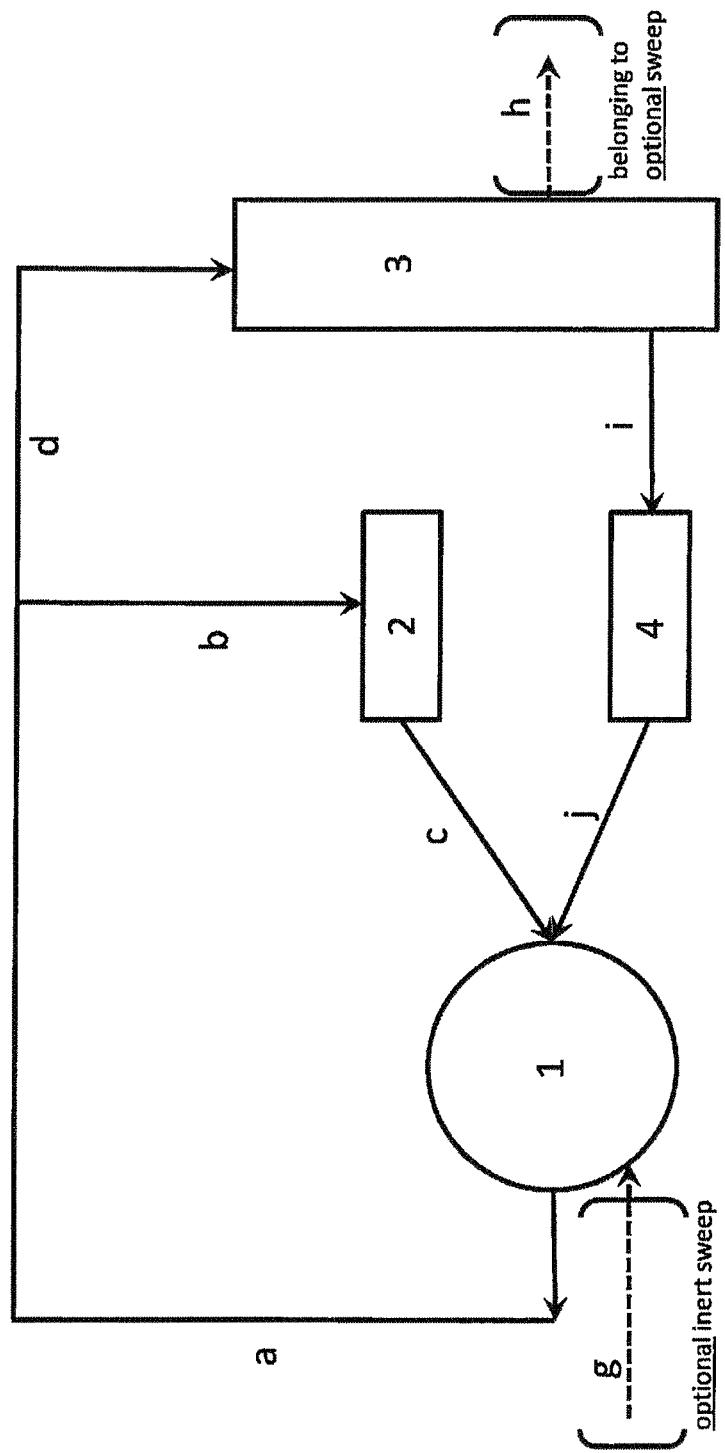
FIG. 3 presents a flow scheme for an alternative process of the invention involving a recycle heater.

FIG. 3 presents a flow scheme for an alternative process of the invention. This is similar to FIG. 1, but involves a recycle heater (4) which receives a flow (i) from the condenser and which exerts a gas flow (j) into the reactor (1).

FIGS. 4, 5, 6, and 7 show schematically different possibilities for directing gas flow and/or possibilities for full or partial heat exchange for the gas loop.

In FIG. 4, a reactor (at bottom) and a gas loop system are shown that allow the reversal of flow direction in the reactor without having to change the direction of the gas flow in the fans (left top).

In FIG. 5, a reactor and a gas loop system are shown that allow the reduction of the pressure drop in the gas loop during phases where heat exchange to the gas is not required. This can be done by avoiding the pathway through the heat exchanger (fully or partly) by positioning of switching plates SP1 and SP2. The heat exchanger will give a higher pressure drop due to f.i. internal piping, reducing the flow rate and/or increasing the energy consumption.

FIG. 6 shows a reactor and a gas loop system that allow reduction of the pressure drop in the gas loop during phases where heat exchange to the gas is not required. This can be done by surpassing the pathway through the heat exchanger, partly or completely, by positioning of valves V1 and V2.

FIG. 7 shows a reactor and gas loop design with the heat exchanger inside the reactor. This can be separate porous plate heat exchangers (as drawn here) or a combined functionality of porous plate heat exchanger and gas distribution plate in one.

The invention claimed is:

1. A process for the acetylation of lignocellulosic material, comprising:
    introducing the lignocellulosic material into a reaction vessel, the reaction vessel having a closable aperture suitable for the introduction of the lignocellulosic material, a vacuum connection suitable for creating vacuum in the reaction vessel, a liquid-inlet and/or liquid-outlet for acetylation fluid, and a gas-inlet and gas-outlet connected to a first gas flow loop, said first gas flow loop comprising a gas flow line connecting the gas-inlet and the gas-outlet, said gas flow line connected to a heat exchanger and at least one fan, wherein the gas-inlet and the gas-outlet of the first gas flow loop are positioned such as to allow gas circulation transversal to a length of the reaction vessel, wherein the inlet for the first gas flow loop is connected to a gas distribution device positioned between the inlet and the inside of the reaction vessel at a first side of the reaction vessel, wherein further a second gas distribution device is provided between the inside of the reactor and the outlet to the first gas flow loop at a second side of the reaction vessel;
    filling the reaction vessel with acetylation fluid so as to submerge the lignocellulosic material;
    allowing the lignocellulosic material to become impregnated with acetylation fluid;
    removing excess acetylation liquid, applying heat to the impregnated lignocellulosic material by circulating heated gas through the reactor via said first gas flow loop and, where applicable, via said further gas flow loops, so as to allow acetylation of the lignocellulosic material to occur.

2. The process according to claim 1, wherein the impregnation with acetylation fluid is conducted by first putting the reaction vessel, when filled with the wood or other lignocellulosic material, under vacuum and then introducing the acetylation fluid while maintaining vacuum, preferably so as to completely submerge all the wood elements.

3. The process according to claim 1, wherein the lignocellulosic material is solid wood having a size of at least 1 m in at least one dimension, wherein the solid wood is provided as a stack beams or planks in the reaction vessel.

4. The process according to claim 1, wherein the at least one fan is placed outside the reaction vessel.

5. A process for the acetylation of lignocellulosic material, comprising the steps of (a) impregnating the lignocellulosic material with an acetylation fluid in a reaction vessel and removing the excess acetylation liquid; (b) heating the impregnated lignocellulosic material by means of a flow of heated gas so as to allow acetylation of the lignocellulosic material to occur; (c) lowering the pressure to which the lignocellulosic material is subjected so as to allow residual acetylation fluid to migrate out of the lignocellulosic material; (d) splitting off a portion of the flow of the heated gas circulating through the reaction vessel to subject the portion to condensation, wherein the portion is less than 50 volume percent of the flow of heated gas circulating through the reaction vessel, wherein this portion that is split off the flow of heated gas is decreased during recovery of the migrated residual acetylation fluid.

6. The process according to claim 5, wherein the impregnation with acetylation fluid is conducted by first putting the reaction vessel, when filled with the wood or other lignocellulosic material, under vacuum and then introducing the acetylation fluid while maintaining vacuum.

7. The process according to claim 5, wherein the lignocellulosic material is solid wood having a size of at least 1 m in at least one dimension.

* * * * *